Nov. 30, 1948.  L. COOK  2,455,329
MECHANICAL LINKAGE
Filed Nov. 22, 1943  3 Sheets-Sheet 2

INVENTOR.
Lyman Cook
BY
Blair, Curtis + Hayward
ATTORNEYS

Nov. 30, 1948.   L. COOK   2,455,329
MECHANICAL LINKAGE
Filed Nov. 22, 1943   3 Sheets-Sheet 3
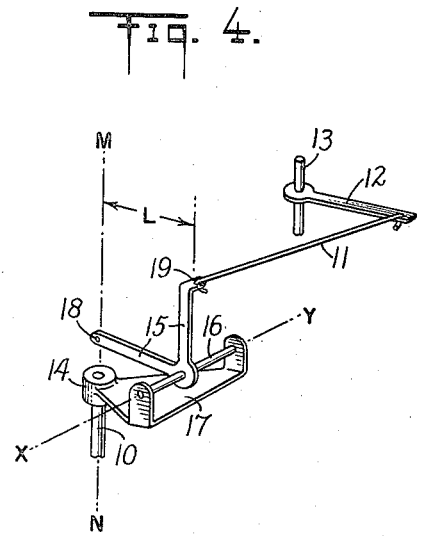
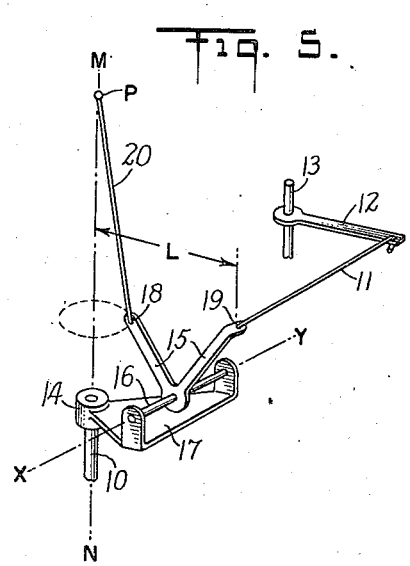
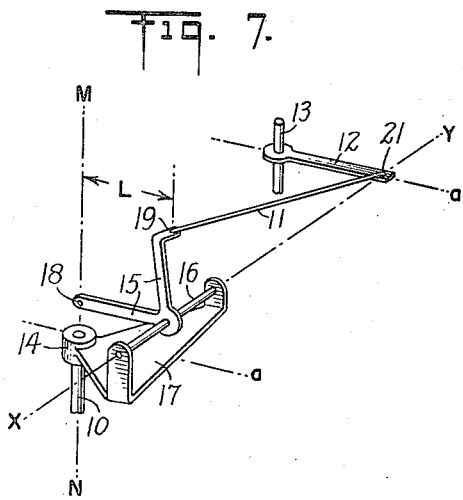
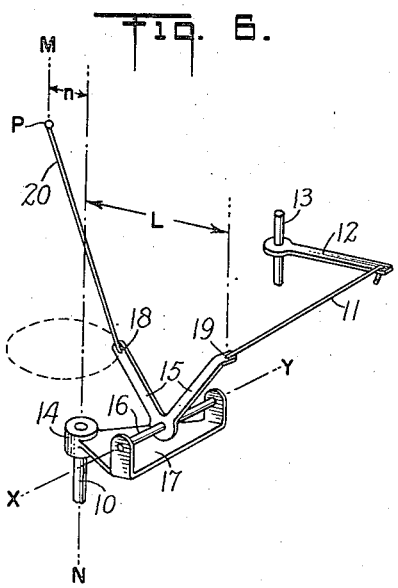
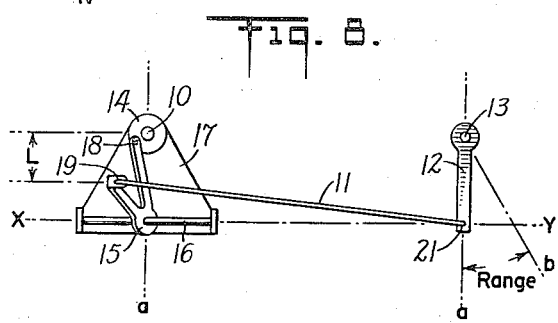
INVENTOR.
Lyman Cook
BY
Blair, Curtis & Hayward
ATTORNEYS Patented Nov. 30, 1948

2,455,329

UNITED STATES PATENT OFFICE 2,455,329

MECHANICAL LINKAGE

Lyman Cook, Foxboro, Mass., assignor to The Foxboro Company, Foxboro, Mass., a corporation of Massachusetts Application November 22, 1943, Serial No. 511,381

6 Claims. (Cl. 74—1)

This invention relates to lever and linkage systems of sensitive control instruments, and more particularly to novel mechanism for effecting a continuous change of mechanical advantage or multiplication in a lever and linkage system of the character described.

In indicating and recording and controlling instruments frequently it is desirable to modify the indication of the condition whose value is being measured by a sensitive element by another secondary variable condition in order to obtain the desired indication. For example, it is often desired to compensate the measurement of flow for the effect of variations in temperature or static pressure. Specific gravity, viscosity and other variable conditions are frequently referred to a standard reference temperature, and measurements made at temperatures other than standard require compensation for purposes of standardization.

Similarly, it is often desired to regulate the flow of one fluid so that it bears a fixed predetermined ratio to the flow of some other fluid where the rate of flow of the second fluid is not readily controlled. Some examples might be the control of fuel to air ratio, blending of petroleum products, introduction of odorant into illuminating gas or introduction of dye into continuously flowing material.

Similarly, it is also frequently desired to modify the setting of the control point of a regulator in controllable proportionality to the variations of some condition affecting the process being controlled.

It is accordingly an object of the present invention to provide an improved device for furnishing indicating and control instruments with a mechanical adjustment means which will introduce a desired adjustment or compensation into the instrument lever system.

It is a further object of the invention to provide a simple and efficient lever and linkage system suitable to attain continuously variable multiplication.

Other objects will be in part obvious and in part pointed out hereinafter.

The invention accordingly consists in the features of construction, combinations of elements, and arrangement of parts as will be exemplified in the structure to be hereinafter described and the scope of the application of which will be indicated in the following claims.

In the drawings, in which is shown one of the various possible embodiments of the mechanical features of the present invention—

Fig. 1A is a detailed section taken on line 1A—1A of Figure 1;

Fig. 4 is a perspective diagrammatic view of a portion of the lever and linkage system;

Fig. 5 is another diagrammatic view of a portion of the system;

Fig. 6 is a view similar to Fig. 5 showing a modification and showing also diagrammatically the operation of part of the mechanism of Fig. 1;

Fig. 7 is a similar view showing another modification of the form shown in Fig. 4;

Fig. 8 is a plan view of the system shown in Fig. 7.

Similar reference characters refer to similar parts in the several figures of the drawings.

Figure 1:
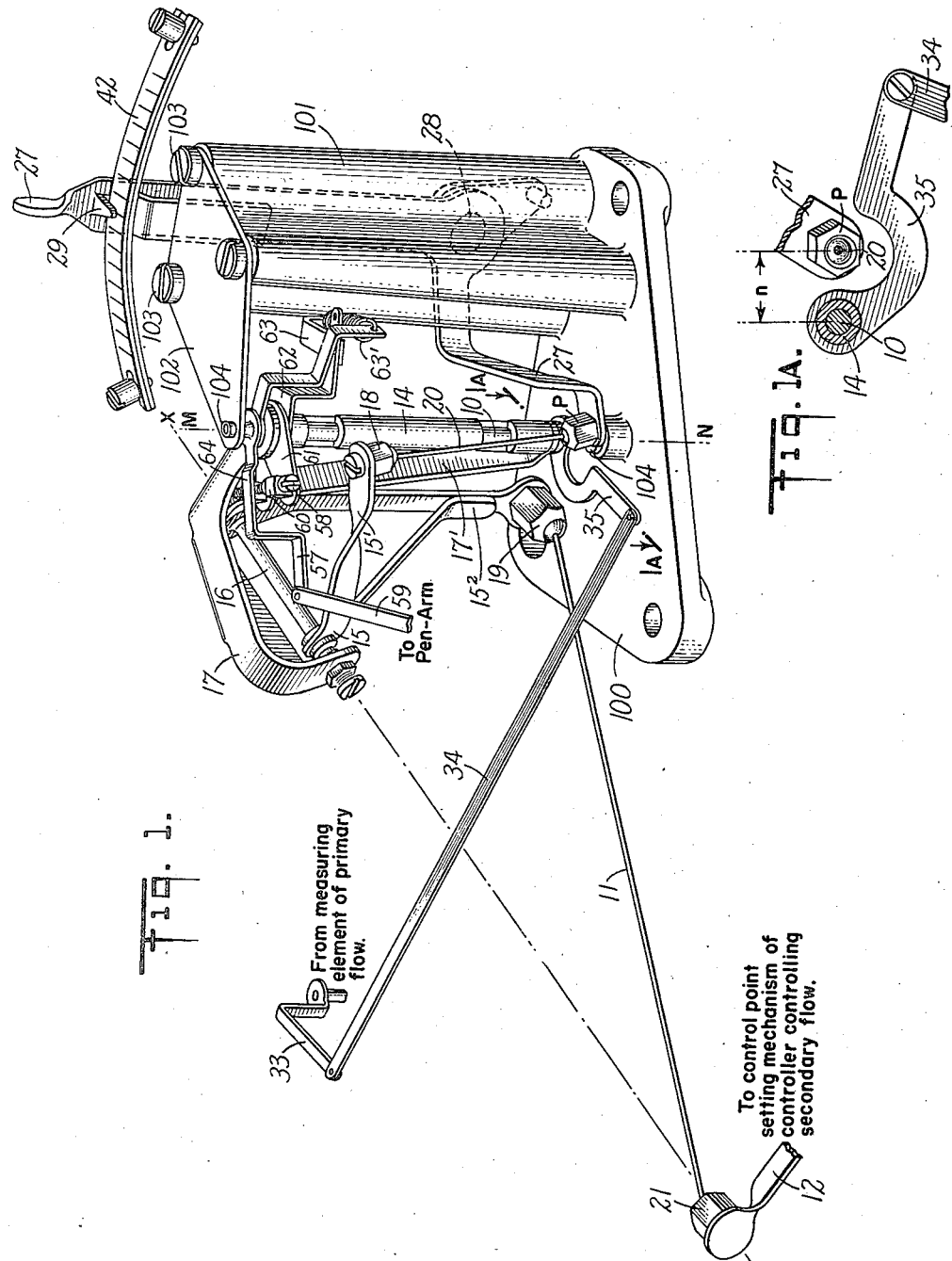
Fig. 1 is a perspective view of a lever and linkage unit, of the character described.

This linkage and lever system functions to provide a lever of adjustable length L. In the form shown in Figure 4 the adjustable "lever" is connected by link 11 to a second lever 12 of fixed length which is rotatable about a pivot 13. This second lever 12 may be either the driver or the driven lever.

The adjustable "lever" 15 is composed as follows: Hub 14 rotates on arbor 10 about axis MN. Yoke 17 rigidly fastened to hub 14 carries arbor 16 on axis XY. Bell crank 15 is rigidly attached to arbor or pivot 16 which is carried by suitable bearings in yoke 17 so that pivot 16 may be rotated about axis XY. Bell crank 15 is mounted so it can swing freely except when either point 18 or point 19 is restrained.

If point 18 at the end of bell crank 15 is restrained so that bell crank 15 cannot rotate about axis XY, any motion of hub 14, whether rotary or oscillatory, about axis MN is transmitted to point 19 and point 19 will rotate with hub 14 about axis MN at the fixed distance L from axis MN.

Now if the position of point 18 is changed, length L will change proportionately through rotation of bell crank 15. Thus, by altering the position of point 18 a variable lever length L is effectively obtained. The alteration of lever length L is obtained by this method regardless of whether the entire structure is at rest or in motion about axis MN.

Referring to Figure 5, if a constant value of lever length L of some selected magnitude is desired, point 18 of bell crank 15 must not move in a direction parallel to axis MN. It must, however, lie on axis MN or describe a circle or arc about MN when the entire structure rotates with hub 14. This motion is obtained by adding link 20 to the structure shown in Figure 4 which is fixed at point P on axis MN. Now length L is adjusted by moving point P along axis MN.

Referring to Figure 6, if, however, it is desired to have lever length L constantly varying during the motion of the structure about axis MN this can be accomplished by fixing the end of link 20 at some point P which lies at a distance $n$ from axis MN. This offset $n$ in point P from axis MN causes point 18 (when point 18 is spaced from axis MN) and hence point 19 to describe a non-circular path upon rotation of hub 14. Thus it can be seen that lever length L is caused to vary continuously as the whole structure rotates about axis MN. The exact amount of departure from uniform multiplication produced by this system is seen to depend upon the amount of offset $n$ which is introduced into the system at point P when point P of Figure 5 is moved from its position along axis MN, and the extent to which the point 18 is spaced from the axis MN. This type of action, whereby a continuously varying lever length L is desired as hub 14 is rotated about axis MN, is sometimes required as a compensating or corrective action when non-uniform multiplication exists in some other part of the instrument linkage system.

It is also true that if the actual embodiment of the invention takes the form shown in Figure 6, the resulting non-uniformity of multiplication obtained by introducing offset $n$ into the linkage system can be compensated for or corrected to a resultant uniform effective multiplication by the introduction of another non-uniform linkage arrangement elsewhere in the linkage system of the completed instrument.

In the linkage systems shown in Figures 4, 5, and 6, assuming hub 14 at rest, motion of link 20 to adjust the effective length L of the lever system produces motion of lever 12 about axis of pivot 13. It is often desired to be able to make an adjustment of lever length L at some point in the path of motion of lever 12 without introducing motion into lever 12. In Figures 7 and 8 there is shown such a lever system. In Figure 7, lever 12 is so located on pivot 13 that axis XY passes through point 21 where link 11 is fastened to lever 12 at some predetermined position $a$ in the range of motion of lever 12. Thus it can be seen that when lever 12 is in position $a$ its point 21 lies on axis XY, as shown in Figures 7 and 8. In this position the effective lever length L can be adjusted throughout its range of adjustment without moving lever 12 or yoke 17 away from position $a$.

The arrangement shown in Figure 7 is particularly useful, for example where it is desired to compensate the reading of a differential pressure mercury manometer type flow meter for variations in static pressure. For such service it can be assumed that the movement of the pivot 10 and hub 14 is made responsive to the differential pressure; and that the movement of the point 18 on the bell crank 14 is made responsive to the static pressure. It is readily seen, therefore, that for the condition of zero flow (zero differential pressure) the pivot 10 and hub 14 will position the lever 12 in position $a$; so that no motion is imparted to the indicator which would be moved by the lever 12, as variation in the static pressure moves the point 18 of the bell crank 15.

Figure 3:
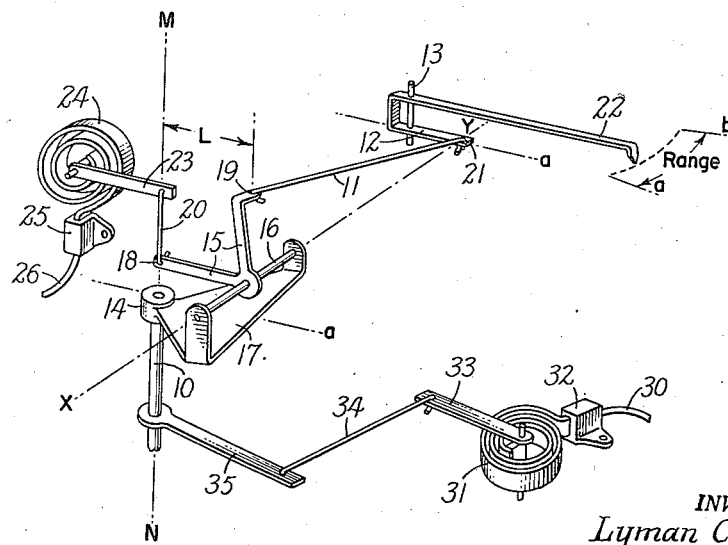
Fig. 3 is a perspective diagrammatic view showing the lever and linkage system used to compensate the indication of one variable for variation in a second variable.

Figure 3 shows the details of the link and leverage system of the invention adapted to the pressure compensation of a flow meter remote from the place of measurement. It has become increasingly common, where it is desired to obtain an indication or a record at a place some distance removed from the point of measurement, to transmit from the measuring point to an indicator or recorder a pneumatic pressure proportional to the value of the condition being measured. In Figure 3 pipe 30 leads to such a pneumatic transmitter (not shown) which transmitter has an output pressure proportional to the flow measurement. The pipe 30 conducts this output pressure to a spiral Bourdon tube 31 mounted on a suitable connection block 32 fastened to the instrument case (not shown). Movement of the spiral Bourdon tube 31 in response to pressure in pipe 30 positions lever arm 33 so that it takes up positions proportional to the value transmitted by the pneumatic transmitter. Movement of lever arm 33 through link 34 in turn moves lever arm 35. This movement in turn imparts a rotary motion to pivot 10 and hence to hub 14. Also, as described above, rotation of hub 14 about axis MN moves point 19 which is connected by link 11 to lever 12 pivoted on pivot 13 and to which lever is connected indicator pointer 22. However, the amount of motion imparted to lever 12 and hence to indicator 22 by a given rotation of hub 14 is dependent upon the adjustment of variable lever length L. The adjustment of lever length L is made dependent upon the static pressure of the flow being measured by connecting point 18 to lever 23 by means of link 20. The motion of lever arm 23 is actuated by the motion of spiral Bourdon tube 24 which in turn is connected by connection block 25 and pipe 26 which goes to the conduit (not shown) in which the flow is being measured.

In the position shown in Figure 3, with the indicator at point $a$ of the range scale which corresponds to zero flow, motion of point 19 in response to movements of the spiral Bourdon tube 24 produced by changes in static pressure in pipe 26 produces no change of position of indicator 22. For all the other positions of indicator 22 along the range from $a$ to $b$ of the range scale, the position of indicator 22 in response to the position of hub 14, which in turn is indicative of the flow transmitted to spiral Bourdon tube 31 by the pneumatic transmitter, is modified by the adjustment of lever length L made in response to variations in the static pressure which actuates spiral Bourdon tube 24.

Figure 2:
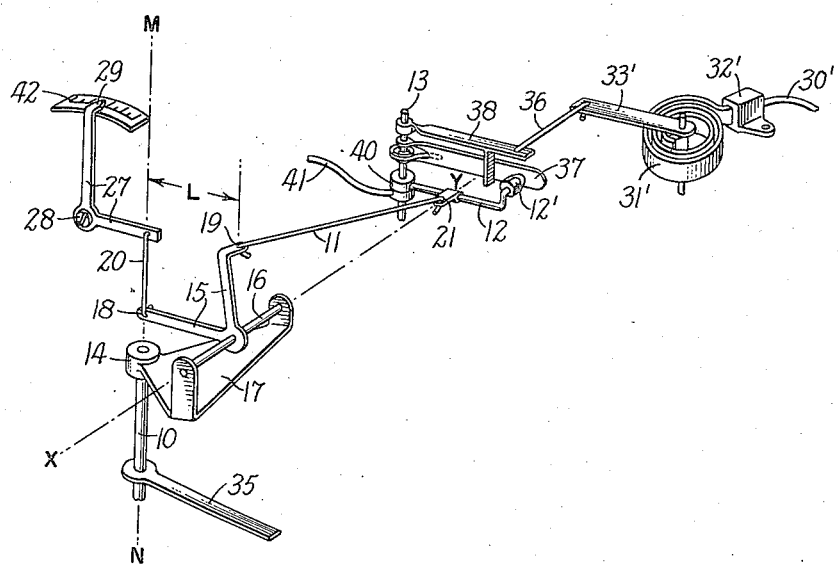
Fig. 2 is a perspective diagrammatic view showing how a linkage system such as shown in Fig. 1 may be used in a ratio flow controller to vary the ratio in which a controlled flow is regulated with respect to an unregulated flow.

In Figure 2 the link and lever system is modified for use in a ratio flow control system where it is employed to vary the ratio in which one flow is controlled with respect to a second flow. In such a controller or control system the value of one flow (the primary flow) is effectively used to set the control point of the controller which is made responsive to and controls the second flow (the secondary flow). In Figure 2 the adjustable lever length L is manually operated by bell crank 27 to which link 20 is attached. Bell crank 27 is pivoted about shoulder screw 28 by which it is attached to supporting structure (not shown). Bell crank 27 terminates in pointer 29 which moves along a scale 42 which indicates the ratio setting value. Hub 14, attached to pivot 10, is rotated in response to the movement of a measuring element which is responsive to the first flow of the fluid and with respect to which the second flow is controlled in accordance with a certain ratio. A measuring system such as parts 30, 31, 32, 33, 34, and 35 shown in and described in Figure 3 might be empolyed for this purpose. A nozzle and flapper pilot valve of an on-off controller as shown in the Dixon Patent 1,582,868, issued on April 27, 1926, is operated by the hub 14 in such manner as to adjust the setting of the control point of a controller. To this end the adjustable lever is connected by link 11 to a nozzle lever 12 which is freely pivoted at 13. By this lever system nozzle 12' of the control mechanism is positioned in response to the value of the flow which is measured by the measuring element which rotates hub 14 and by an amount which is determined by the manual adjustment of bell crank 27. The flow, the value of which is to be controlled in predetermined ratio to the value of the flow which operates hub 14, is measured by a system similar to that described for Figure 3. In Figure 2 parts 30', 31', 32', 33', 36, and 38 represent such a measuring system which positions a flapper 37 of the nozzle-flapper pilot valve in response to the value of the flow which is to be controlled. The operation of the nozzle-flapper pilot valve by air supplied through pipe 41 and air connection 40 to actuate a control mechanism is well known and forms no part of the present invention and need not be here described.

In Figure 1, there is shown a preferred embodiment of a lever and linkage system like that diagrammatically shown in Figure 6. A base plate 100 from which extends a standard 101 is provided, with holes by means of which the unit may be bolted to the instrument case (not shown). A plate 102 is secured in spaced parallel relation with base 100, as by means of screw bolts 103. A light weight arbor or pivot 10 is supported between suitable substantially frictionless bearings 104, 104 carried respectively by the plates 100 and 102. A long hub or sleeve 14, freely rotatable upon arbor 10 without substantial end play, carries a yoke member 17 which is further supported in rigid relation to sleeve 14 by a long strap brace 17'.

The yoke 17 rotatably supports between substantially frictionless bearings a pivot 16 laterally spaced from the axis MN of the pivot 10, the axis XY of pivot 16 lying in a plane of intersection with said axis MN, i. e., in a plane that intersects but cannot contain axis MN. A bell crank 15 rotatable with pivot 16 comprises arms 15' and 15² which provide respectively certain linkage points 18 and 19. Lever arm 15' is connected by means of a link 20 with the end P of one arm of a bell crank 27 which is pivotally mounted as at 28 upon the back of the standard 101. The upper end of the other arm of the bell crank 27 is provided with a pointer 29 which cooperates with a scale 42 also mounted on standard 101. Bell crank 27 is a manual adjustment lever and its position in relation to scale 42 shows the adjustment of the length of lever 15, i. e., the adjusted distance between lever point 19 and the axis MN of the pivot 10 (see Figure 6).

The position of the restraining point P of lever 27 along the axis MN determines the leverage of the lever 15. As the point P moves toward the base 100 the lever length 15 becomes greater and vice versa. Also, point P is displaced laterally from the axis MN by a distance N as shown in Figure 1A. Thus, as lever 15 rotates about axis MN, the lever length as determined by the setting of the restraining point P is still further varied.

The connection between the pivot 10 and the sleeve 14 which carries yoke 17 is yieldable so that if the element lever 35 is moved beyond the range of movement of the yoke 17 the parts yield without binding. This connection is made in the following manner. Mounted upon and rotatable with pivot 10 is an arm 57 having a rearward extension 64 shaped in steps to bend toward base 100. Extending from sleeve 14 is a complementary lever 62 which carries a bracket member 63. As viewed in Figure 1 the end of lever 62 passes in back of a tongue portion forming the end of lever 64. A spring 63' normally urges the lever 62 against lever 64, but if lever 64 swings clockwise more than sleeve 14 and its parts can swing, then spring 63' yields to permit relative movement between sleeve 14 and pivot 10. Lever 62 is made adjustable with respect to sleeve 14 so that the relative rotational position of sleeve 14 and pivot 10 may be adjusted. This is accomplished by securing to sleeve 14 an arm 61 carrying a lug 60. Lever 62 is provided with a similar lug, and a micrometer screw 58 is rotatably mounted in lug 60 and threads into the other lug. A link 59 pivotally connected to lever 57 may be employed to make operative connection with a pen arm of the control instrument (not shown).

Point 19 of adjustment lever 15 may be connected by means of a link 11 with a lever arm 12 corresponding to the nozzle lever 12 of Figure 2. Thus, movement of the yoke 17 adjusts the setting of the control point of the controller.

The shaft supporting the lever 15 in the yoke 17 is mounted in the yoke 17 at an angle so that the axis of the lever 15 passes through the point 21 of the lever 12. The point 21 is the point of connection between the link 11 connecting the lever 12 and the lever 15. By reason of this construction, when the control point of the controller is at a neutral position as determined by a neutral position of the lever 12, changing the ratio maintained by the flow controller, by adjusting the lever 27, does not change the control point. Such construction as above pointed out has particular advantages and particular applications to such a ratio controller. By selecting the angular position of the shaft 16 supporting the lever 15, the point of connection between the lever 12 and the link 11 may be located in different planes. This provides for convenience of manufacture and simplifies the problem of assemblying various control parts into an instrument case.

Also carried by pivot 10 and adapted to move pivot 10 is a lever arm 35. This lever may be connected by means of a link 34 and lever 33 (Figure 3) to a measuring element such as the float of a differential mercury manometer responsive to the flow of fluid, or such as the Bourdon tube 31 shown in Figure 3.

From the foregoing description with reference to Figure 1 the employment of the lever and linkage system to obtain adjustment of the ratio in which the secondary flow is controlled with respect to a primary flow, may be understood by reference to the description of Figures 2 and 6. In such relationship the bell crank 27 is used to adjust manually the predetermined ratio of primary flow to secondary flow. Sleeve 14 would be rotated in response to the movement of a measuring element which is responsive to the primary flow. As the yoke 17 is swung about the axis MN by variation of the primary flow, the control point of the controller is varied; and the ratio is constantly changed by reason of the offset $n$ of the restraining means P.

From the foregoing it will be seen that this invention provides a novel and simple device for obtaining a continuous change of mechanical advantage in a linkage system which provides (1) a change of mechanical linkage obtained by manual adjustment and (2) a further change that occurs automatically as one of the parts of the system is rocked by a driven element of the instrument.

As many possible embodiments may be made of the present invention without departing from the scope thereof, it is to be understood that all matter herein set forth or shown in the accompanying drawings is to be interpreted as illustrative and not in a limiting sense.

I claim:

1. In a lever and linkage system of the character described for transmitting the motion of a first element to a second element in accordance with an adjustable ratio, a rotatable member connected to said first element and pivotally mounted to rotate about a fixed axis to positions corresponding to positions of the first element, a crank lever pivotally mounted upon said rotatable member to rotate about a movable axis angularly disposed in relation to said fixed axis, said crank having a driving arm and a positionable arm, each of which arms has a mechanical connection point, a ratio adjusting member mounted for adjustment along a path effectively parallel to said fixed axis, a first connecting member for mechanically connecting the connecting point of said positionable arm and said ratio adjusting member positively to pivot said crank about said movable axis as said ratio adjusting member is adjusted along said path but to leave said positionable arm free to revolve about the fixed axis, whereby the connecting point of said driving arm is movable toward and away from said fixed axis as said adjusting member is moved along said path but is free to rotate about said fixed axis, and second connecting means for mechanically connecting the connecting point of said driving arm to said second element whereby a given movement of said rotatable member by said first element moves the connecting point of said driving arm and the second element a proportionate amount determined by the setting of said ratio adjusting member along said path.

2. In a lever and linkage system of the character described for transmitting the motion of a first element to a second element in accordance with an adjustable ratio, a rotatable member connected to said first element and pivotally mounted to rotate about a fixed axis to positions corresponding to positions of the first element, a crank lever pivotally mounted upon said rotatable member to rotate about a movable axis angularly disposed in relation to said fixed axis, said crank having a driving arm and a positionable arm, each of which arms has a mechanical connection point, a ratio adjusting member mounted for adjustment along a path effectively concentric with said fixed axis, a first connecting member for mechanically connecting the connecting point of said positionable arm and said ratio adjusting member positively to pivot said crank about said movable axis as said ratio adjusting member is adjusted along said path but to leave said positionable arm free to revolve about the fixed axis, whereby the connecting point of said driving arm is movable toward and away from said fixed axis as said adjusting member is moved along said path but is free to rotate about said fixed axis, second connecting means for mechanically connecting the connecting point of said driving arm to said second element whereby a given movement of said rotatable member by said first element moves the connecting point of said driving arm and the second element a proportionate amount determined by the setting of said ratio adjusting member along said path, and the path of said ratio adjusting member being coincident with said fixed axis causes said adjusting member and connecting member to hold said positioning arm from rotating about said movable axis as said crank is revolved about said first axis.

3. In a lever and linkage system of the character described for transmitting the motion of a first element to a second element in accordance with an adjustable ratio, a rotatable member connected to said first element and pivotally mounted to rotate about a fixed axis to positions corresponding to positions of the first element, a crank lever pivotally mounted upon said rotatable member to rotate about a movable axis angularly disposed in relation to said fixed axis, said crank having a driving arm and a positionable arm, each of which arms has a mechanical connection point, a ratio adjusting member mounted for adjustment along a path effectively parallel to said fixed axis, a first connecting member for mechanically connecting the connecting point of said positionable arm and said ratio adjusting member positively to pivot said crank about said movable axis as said ratio adjusting member is adjusted along said path but to leave said positionable arm free to revolve about the fixed axis, whereby the connecting point of said driving arm is movable toward and away from said fixed axis as said adjusting member is moved along said path but is free to rotate about said fixed axis, second connecting means for mechanically connecting the connecting point of said driving arm to said second element whereby a given movement of said rotatable member by said first element moves the connecting point of said driving arm and the second element a proportionate amount determined by the setting of said ratio adjusting member along said path; and the said path of said ratio adjusting member being laterally displaced from said fixed axis, whereby revolving movement of said crank about said fixed axis imparts a rotating movement to said crank about said movable axis and changes the ratio of movement of the first element to the second element.

4. In a lever and linkage system of the character described for transmitting the motion of a first element to a second element in accordance with an adjustable ratio, a rotatable member connected to said first element and pivotally mounted to rotate about a fixed axis to positions corresponding to positions of the first element, a crank lever pivotally mounted upon said rotatable member to rotate about a movable axis angularly disposed in relation to said fixed axis, said crank having a driving arm and a positionable arm, each of which arms has a mechanical connection point, a ratio adjusting member mounted for adjustment along a path effectively parallel to said fixed axis, a first connecting member for mechanically connecting the connecting point of said positionable arm and said ratio adjusting member positively to pivot said crank about said movable axis as said ratio adjusting member is adjusted along said path but to leave said positionable arm free to revolve about the fixed axis, whereby the connecting point of said driving arm is movable toward and away from said fixed axis as said adjusting member is moved along said path but is free to rotate about said fixed axis, second connecting means for mechanically connecting the connecting point of said driving arm to said second element whereby a given movement of said rotatable member by said first element moves the connecting point of said driving arm and the second element a proportionate amount determined by the setting of said ratio adjusting member along said path, said movable axis being laterally displaced from said fixed axis and said arms being at substantially less than 180° one to the other.

5. In a lever and linkage system of the character described for transmitting the motion of a first element to a second element in accordance with an adjustable ratio, a rotatable member connected to said first element and pivotally mounted to rotate about a fixed axis to positions corresponding to positions of the first element, a crank lever pivotally mounted upon said rotatable member to rotate about a movable axis angularly disposed in relation to said fixed axis, said crank having a driving arm and a positionable arm, each of which arms has a mechanical connection point, a ratio adjusting member mounted for adjustment along a path effectively parallel to said fixed axis, a first connecting member for mechanically connecting the connecting point of said positionable arm and said ratio adjusting member positively to pivot said crank about said movable axis as said ratio adjusting member is adjusted along said path but to leave said positionable arm free to revolve about the fixed axis, whereby the connecting point of said driving arm is movable toward and away from said fixed axis as said adjusting member is moved along said path but is free to rotate about said fixed axis, second connecting means for mechanically connecting the connecting point of said driving arm to said second element whereby a given movement of said rotatable member by said first element moves the connecting point of said driving arm and the second element a proportionate amount determined by the setting of said ratio adjusting member along said path, the point of connection between said second connecting member and said second element being so selected as to coincide with a projection of said movable axis when said first element occupies a neutral position whereby with the parts in said neutral position movement of said ratio adjusting member along its path and the consequent pivoting of said crank about the movable axis produces no movement of said second element.

6. In a lever and linkage system of the character described for transmitting the motion of a first element to a second element in accordance with an adjustable ratio, a rotatable member connected to said first element and pivotally mounted to rotate about a fixed axis to positions corresponding to positions of the first element, a crank lever pivotally mounted upon said rotatable member to rotate about a movable axis angularly disposed in relation to said fixed axis, said crank having a driving arm and a positionable arm, each of which arms has a mechanical connection point, a ratio adjusting member mounted for adjustment along a path effectively parallel to said fixed axis, a first connecting member for mechanically connecting the connecting point of said positionable arm and said ratio adjusting member positively to pivot said crank about said movable axis as said ratio adjusting member is adjusted along said path but to leave said positionable arm free to revolve about the fixed axis, whereby the connecting point of said driving arm is movable toward and away from said fixed axis as said adjusting member is moved along said path but is free to rotate about said fixed axis, second connecting means for mechanically connecting the connecting point of said driving arm to said second element whereby a given movement of said rotatable member by said first element moves the connecting point of said driving arm and the second element a proportionate amount determined by the setting of said ratio adjusting member along said path, the point of connection between said second connecting member and said second element being so selected as to coincide with a projection of said movable axis when said first element occupies a neutral position whereby with the parts in said neutral position movement of said ratio adjusting member along its path and the consequent pivoting of said crank about the movable axis produces no movement of said second element, and said movable axis being so angularly disposed with respect to said fixed axis as to locate said point of connection between said second connecting member and said second element as desired with respect to said rotatable member.

LYMAN COOK.

REFERENCES CITED

The following references are of record in the file of this patent:

UNITED STATES PATENTS

| Number | Name | Date |
|---|---|---|
| 2,276,702 | Riporbelli et al. | Mar. 17, 1942 |
| 2,296,714 | Ibbott | Sept. 22, 1942 |
| 2,333,083 | Dueringer | Nov. 2, 1943 |
| 2,364,718 | Itott | Dec. 12, 1944 |